(12) United States Patent
Katschorek et al.

(10) Patent No.: US 7,862,880 B2
(45) Date of Patent: *Jan. 4, 2011

(54) FILM COMPRISING A POLYMER LAYER

(75) Inventors: Haymo Katschorek, Obermichelbach (DE); Andreas Schilling, Hagendorn (CH); Mathias Seitz, Buckenhof (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 951 days.

This patent is subject to a terminal disclaimer.

(21) Appl. No.: 11/568,027

(22) PCT Filed: Apr. 13, 2005

(86) PCT No.: PCT/DE2005/000667

§ 371 (c)(1),
(2), (4) Date: Feb. 14, 2007

(87) PCT Pub. No.: WO2005/101101

PCT Pub. Date: Oct. 27, 2005

(65) Prior Publication Data

US 2008/0280107 A1    Nov. 13, 2008

(30) Foreign Application Priority Data

Apr. 17, 2004 (DE) ................. 10 2004 018 702

(51) Int. Cl.
C09K 19/00 (2006.01)
G02F 1/1335 (2006.01)
G02F 1/13 (2006.01)
G02B 5/30 (2006.01)
G02B 27/28 (2006.01)

(52) U.S. Cl. .............. 428/172; 428/1.3; 428/1.31; 359/489; 359/501; 359/566; 359/569; 349/98; 349/194

(58) Field of Classification Search .......... 349/98, 349/194; 359/489, 492, 501, 566, 569; 283/90; 428/1.3, 1.31, 172

See application file for complete search history.

(56) References Cited

U.S. PATENT DOCUMENTS 5,903,330 A * 5/1999 Funfschilling et al. ...... 349/129

(Continued)

FOREIGN PATENT DOCUMENTS

DE          3942663 A1     6/1991

(Continued)

OTHER PUBLICATIONS

New Focus, Inc., "Polarization and Polarization Control", Accessed on Dec. 16, 2009 from aries.ucsd.edu/LMI/TUTORIALS/polarization.pdf.*

(Continued)

*Primary Examiner*—David R Sample
*Assistant Examiner*—Catherine Simone
(74) *Attorney, Agent, or Firm*—Hoffmann & Baron, LLP

(57) ABSTRACT

The invention concerns a film, in particular a stamping film, laminating film or sticker film, which has at least one anisotropic polymer layer of an at least partially oriented liquid crystal material. The anisotropic polymer layer has one or more first regions which form a first security feature and in which the anisotropic polymer layer has properties which linearly polarise or which rotate the direction of rotation, and one or more second regions which form a second security element and in which the anisotropic polymer layer has circularly polarising properties. The first security feature is visualised when viewed through a first polariser and the second security feature is visualised when viewed through a second polariser responsive to a different polarisation state from that of the first polariser.

28 Claims, 6 Drawing Sheets

U.S. PATENT DOCUMENTS

| | | | |
|---|---|---|---|
| 5,909,313 A * | 6/1999 | Lee | 359/569 |
| 5,917,570 A | 6/1999 | Bryan-Brown et al. | |
| 6,271,906 B1 | 8/2001 | Funfschilling et al. | |
| 6,496,287 B1 | 12/2002 | Seiberle et al. | |
| 6,924,934 B2 * | 8/2005 | Schilling et al. | 359/576 |
| 2002/0081400 A1 * | 6/2002 | Gocho et al. | 428/29 |
| 2003/0035191 A1 | 2/2003 | Moia | |
| 2003/0193184 A1 | 10/2003 | Taylor et al. | |
| 2003/0214728 A1 * | 11/2003 | Olczak | 359/707 |
| 2006/0023157 A1 | 2/2006 | Hammond-Smith et al. | |

FOREIGN PATENT DOCUMENTS

| | | |
|---|---|---|
| DE | 19833258 C1 | 10/1999 |
| DE | 10013410 A1 | 9/2001 |
| DE | 10023004 | 11/2001 |
| DE | 10328744 A1 | 1/2005 |
| DE | 10331798 A1 | 2/2005 |
| EP | 1227347 | 7/2002 |
| EP | 1336874 | 8/2003 |
| EP | 1336874 A2 * | 8/2003 |
| JP | 2005-538416 | 12/2005 |
| WO | WO 98/52077 | 11/1998 |
| WO | WO0155960 A1 | 8/2001 |
| WO | WO03054810 | 7/2003 |
| WO | WO03055691 A1 | 7/2003 |

OTHER PUBLICATIONS

Statement of Grounds of Opposition dated Jun. 24, 2010 and filed in Australian Patent Application No. 2005233672.

Berremen, Dwight W., "Solid Surface Shape and the Alignment of an Adjacent Nematic Liquid Crystal", Physical Review Letters, vol. 28, No. 26, pp. 1683-1686, Jun. 26, 1972.

Jones, et al., "Novel bistable liquid crystal displays based on grating alignment", Proc SPIE vol. 3955, pp. 84-93, 2000.

Moia et al., "Optical LPP/LCP Devices: A new Generation of Optical Security Elements", Proc SPIE vol. 3973, pp. 196-203, 2000.

Japanese Office Action dated Sep. 7, 2010 issued for Application No. 2007-507663.

* cited by examiner

FILM COMPRISING A POLYMER LAYER

This application claims priority based on an International Application filed under the Patent Cooperation Treaty, PCT/DE2005/000667, filed on Apr. 13, 2005 and German Application No. 10 2004 018 702.9, filed on Apr. 17, 2004.

BACKGROUND OF THE INVENTION

The invention concerns a film, in particular a stamping film, laminating film or sticker film, which has at least one optically anisotropic layer comprising an at least partially oriented liquid crystal material.

EP 1 227 347 describes aligning liquid crystal polymers (=LCP) on a photopolymer layer and in that way generating a security feature which can be recognised by means of a polariser.

A first orientation layer is printed out on a substrate by means of an ink jet printer, the orientation layer comprising a photopolymer which can be aligned in a given orientation direction by irradiation with polarised light. That layer is now irradiated with polarised light. Then a layer comprising a liquid crystal material is applied to the orientation layer by means of an ink jet printer and conditions are created under which the liquid crystal material is aligned. The liquid crystal material is then hardened by means of UV radiation. Thus, in the region in which the orientation layer comprising a photopolymer and the liquid crystal layer is applied by printing, an anisotropic polymer layer comprising an oriented liquid crystal material is produced whereby the light which is incident in that region is linearly polarised.

In addition EP 1 227 347 describes that two orientation layers can be applied to a substrate in mutually superposed relationship. In that case the two layers are each irradiated with differently polarised light and then fixed so that the result is orientation layers with a differing orientation, which are arranged in mutually superposed relationship. Thus, that multiple coating in combination with a corresponding patterned configuration of the individual, mutually superposed polymer layers makes it possible to produce regions involving differing orientation and thus regions in which the light is linearly polarised in different directions.

In addition WO 01/55960 describes the provision in a security element of a layer comprising a liquid crystal material which is aligned in region-wise manner in different orientation directions. In this case also orientation of the liquid crystal molecules is effected by means of a photopolymer layer which is exposed with linearly polarised light and which serves subsequently for orientation of the liquid crystal molecules prior to cross-linking thereof. In that case regions with a differing alignment of the liquid crystal molecules are arranged in such a way that, in those regions, an object is encoded which is decoded by means of a special associated polariser which also has a corresponding liquid crystal layer which is matched to the security element and which is oriented differently in region-wise manner. In that way it is possible for two different items of image information to be introduced into an optical security element: when the security element is viewed through a 'normal' polariser a first latent image is displayed. When the security element is viewed through the above-described polariser which is matched to the security element, with a liquid crystal layer which is oriented differently in region-wise manner—referred to hereinafter as the 'key'—a second image is decoded and thus rendered visible. A disadvantage with that method is that the security element and the 'key' (analyser tool) must be exactly matched to each other and the additional security information can only be retrieved when there is a suitable 'key'. Production of an appropriate 'key' thus involves a similar high level of complication and expenditure to the production of the actual security element.

SUMMARY OF THE INVENTION

Now the object of the invention is to provide a simplified and less expensive process for an optical security element which is based on oriented liquid crystal layers and which combines in itself two different items of latent image information which can be selectively read out with commercially available inexpensive analyser tools.

That object is attained by a film, in particular a stamping film, laminating film or sticker film which has at least one anisotropic layer comprising an at least partially oriented polymer material, preferably a liquid crystal polymer. The anisotropic layer or the anisotropic layers of the at least partially oriented polymer material form in that case regions which respond to different polarisation states of incident light and contain different items of image information in dependence thereon.

In that case the first latent security feature can be rendered visible when viewed through a first polariser, for example a linear polariser, and the second security feature can be rendered visible when viewed through a second polariser which is responsive to a different polarisation state, for example a circular polariser.

It is thus possible by means of the invention to provide two or more items of latent image information in superposed relationship in one working step in one security feature, which items of image information can be selectively visualised by means of simple aids, namely a polariser which is responsive to linearly polarised light and a polariser which is responsive to circularly polarised light. The polarisers necessary for that purpose, as analyser tools, are commercially available and can be used without further modification. By virtue of the combination of regions which are responsive in different ways to various polarisation states the security features produced by means of the invention are of high complexity and can only be copied with difficulty. Attempts at copying the one security element respectively also influence the other security element so that forgery or copying of the security features provided by the film according to the invention is possible only with very great difficulty. The film thus affords a high measure of security combined with the advantage already mentioned above, that simple, inexpensive and wide-spread aids can be used for decoding the concealed security features.

Advantageous configurations of the invention are set out in the appendant claims.

A particularly high level of safeguard against forgery is achieved if an individual anisotropic polymer layer has both first regions with properties which linearly polarise or which rotate the polarisation direction and also second regions with circularly polarising properties. In that case preferably first regions and second regions of the anisotropic polymer layer are arranged in directly mutually adjoining relationship. In that way manipulation or forgery of a security feature is made extremely difficult as any attempt to change a security feature at the same time causes a change in the other security feature. Furthermore imitation of such an anisotropic polymer layer involves a very high level of complication and expenditure.

In accordance with a preferred embodiment of the invention the film has at least one replication layer to which the anisotropic polymer layer of a liquid crystal material is applied. In that case the diffractive structure serves for orientation of the anisotropic polymer material. By means of such a technology it is possible on the one hand for the anisotropic polymer layer comprising a liquid crystal material to be particularly precisely oriented by means of an inexpensive production procedure. In addition that affords a particularly effective possible way of producing the anisotropic polymer layer which has already been described hereinbefore and which has both first regions with properties which linearly polarise or which rotate the polarisation direction and also second regions with circularly polarising properties.

The diffractive structure is so selected that the structural parameters of the diffractive structure, in particular the mean structural depth, differ in the regions, the regions with properties which linearly polarise or which rotate the polarisation direction and regions with circularly polarising properties of the adjoining anisotropic polymer layer.

The choice of the structural parameters of the diffractive structure not only make it possible to adjust the orientation of the anisotropic polymer layer of a liquid crystal material, which is applied to the replication layer, but also to determine whether the anisotropic polymer layer has properties which are linearly polarising or rotate the direction of polarisation, or circularly polarising properties. In that respect the orientation of the anisotropic polymer layer is essentially determined by the azimuth orientation of the diffractive structure. The structural shape, spatial frequency and in particular the mean structural depth determine the polarisation properties of the anisotropic polymer layer of liquid crystal material, which is disposed thereover. The choice of those parameters makes it possible to adjust whether the superposed anisotropic polymer layer of a liquid crystal material has the properties which linearly polarise or rotate the direction of rotation or circularly polarising properties. In that way, for each region of the superposed anisotropic polymer layer, selection of a suitable diffractive structure makes it possible to precisely adjust the direction in which the liquid crystals are oriented and the local polarisation properties which the liquid crystals possess, that is to say whether it has properties which linearly polarise or rotate the direction of polarisation, or circularly polarising properties.

An effect of that kind can be achieved only with difficulty by virtue of the orientation of liquid crystal material on a photopolymer layer oriented by means of irradiation with polarised light or by virtue of orientation of liquid crystal material on a microscratched orientation layer as specific targeted control of the layer thickness of the anisotropic polymer layer on the orientation layer is possible only by a corresponding application process. The apparatus complication and expenditure necessary for that purpose guarantees a very high level of safeguard against forgery.

The diffractive structure is preferably formed from a superimposition of a first and a second structure. The first structure serves in that respect for orientation of the liquid crystal material. The second structure serves for adjusting the properties which linearly polarise or rotate the direction of polarisation or the circularly polarising properties of the anisotropic polymer layer adjoining the replication layer. With that operating procedure the production of the above-described anisotropic polymer layer is made possible in a simple, inexpensive and very precise manner. For example a line grating with a spatial frequency of 1500 lines/mm to 3500 lines/mm and a depth of 50 nm to 500 nm is used as the first structure. By way of example an isotropic matt structure with a structural depth of 200 nm to 800 nm and a lateral correlation length of a few micrometers is used as the second structure.

Preferably a combination grating is used, which comprises an isotropic matt structure and a linear grating with a large number of lines. In that respect for example a sine grating can be used as the linear grating. In that respect the matt structure is preferably of a depth of 50 nm to 2000 nm and has a correlation length in the μm range.

In that respect, in the case of such a combination grating of an isotropic matt structure and a linear grating with a large number of lines, the relatively shallow, high-frequency grating, for example a sine grating (depth of the grating typically for example 140 nm) performs the function of spatially orienting the liquid crystal molecules. In that respect a relatively high number of lines of the sine grating (for example 2860 l/mm) is not absolutely necessary but is highly advantageous. The isotropic matt structure which is relatively deep in comparison therewith (for example typically 600 nm) of the combination grating in contrast involves a relatively great local layer thickness of the liquid crystal layer, as the microscopic structures are filled up by the liquid crystal material. That layer thickness effect in itself is isotropic, that is to say it does not have any preferential spatial orientation. The spatial preferred direction is caused exclusively by the high-frequency shallow linear grating. A region which contains only the relatively shallow high-frequency sine grating (for example typically 140 nm) therefore can exclusively linearly polarise the incident light whereas the combination grating of the shallow sine grating and the deep matt structure produces a combined alignment and layer thickness effect which as a result leads to the circularly polarising optical function.

It was possible to establish that, when using structures of that kind, particularly precise adjustment of the azimuth orientation and the polarisation properties of the anisotropic polymer layer adjoining the replication layer can be achieved.

Alternatively it is also possible for the film to have two or more anisotropic polymer layers comprising an at least partially oriented liquid crystal material, wherein one of the anisotropic polymer layers has regions with properties which linearly polarise or rotate the direction of polarisation and a second anisotropic polymer layer has regions with circularly polarising properties. Particular requirements arise by virtue of the fact that the two layers are to be applied to each other with a very high level of register relationship in order to achieve the advantages of the above-described anisotropic polymer layer with first and second regions.

In accordance with a preferred embodiment of the invention the anisotropic polymer layer has a plurality of image regions which are of an extent of less than 40 μm (that is to say markedly smaller than the resolving power of the human eye), wherein arranged in each of the image regions is at least one of the first regions with properties which linearly polarise or rotate the direction of polarisation and at least one of the second regions with circularly polarising properties. In that way it is now possible for completely different complex security features to be made visible for the viewer in one and the same viewing region when viewing through a first or a second polariser respectively. There is therefore no longer any dependency between the configuration and shaping of the polarisers used as the analyser tool and the security element, as is the case with encoded security features.

Particularly impressive security features which are difficult to imitate can be generated by the first security feature including an object with which are associated first regions with a varying azimuth orientation, for the purposes of generating a grey scale image. In addition the second security feature can also include an object with which are associated second regions with varying azimuth orientation, for the purposes of generating a grey scale image, wherein the first grey scale image becomes visible when using the first polariser and the second grey scale image becomes visible when using the second polariser.

It is also possible for the security feature to include two or more regions in which different, optically anisotropic polymers with different handedness are partially applied. In that way the regions introduced by a diffractive structure as described hereinbefore and which can be selectively visualised with a linear or circular polariser can be further improved in terms of anti-forgery security by the specific use of laevorotatory or dextrorotatory liquid crystal materials as, besides the first latent image being rendered visible through a linear polariser, viewing through a laevorotatory or dextrorotatory circular polariser leads to different further latent images.

Thus different objects are visible to the viewer in dependence on the nature of the polariser used (polariser for linearly polarised light, polariser for light which is circularly polarised in laevorotatory or dextrorotatory relationship) and in dependence on the angular position of the polariser with respect to the film.

In order further to increase the level of security against forgery, it is also possible to arrange first or second regions for encoding a third security feature or a fourth security feature respectively, which become visible when viewed through an associated third or fourth polariser provided with an associated decoded polarisation pattern. It is particularly advantageous however to arrange first and second regions for encoding a fifth security feature, which is visible when viewing through a fifth polariser which is provided with an associated decoding polarisation pattern and which has regions for decoding linearly polarised light and regions for decoding circularly polarised light.

In addition to increase the level of security against forgery it is possible to introduce into the film a further layer having an optically effective diffractive structure which for example generates a hologram or a Kinegram® security feature. The increase in security against forgery can be further achieved by incorporating a thin-film layer system into the film, which produces colour shifts by means of interference. If the film is in the form of a reflective element with a reflecting layer, in particular a metallic layer or an HRI layer, a further optically recognisable security feature can be afforded by the partial configuration of the reflecting layer.

It is particularly advantageous here if the reflecting layer is formed by a layer comprising a cholesteric liquid crystal material which generates a viewing angle-dependent colour shift effect as a further optically recognisable security feature. That can be effected selectively in combination with an additional semi-transparent layer, in particular a thin aluminium layer, which is disposed between the first layer on the anisotropic image-bearing polymer and the cholesteric liquid crystal material layer.

The film is preferably used as an optical security element for safeguarding banknotes, credit cards, identity papers and for safeguarding articles. In addition it is particularly advantageous for the concealed optical security features afforded by a film according to the invention to be in the form of machine-readable optical security features in which items of machine-readable information are encoded such as for example one-dimensional or two-dimensional bar codes.

BRIEF DESCRIPTION OF THE DRAWINGS

The invention is described hereinafter by means of a number of embodiments by way of example with reference to the accompanying drawings in which.

DETAILED DESCRIPTION OF THE INVENTION

Figure 1:
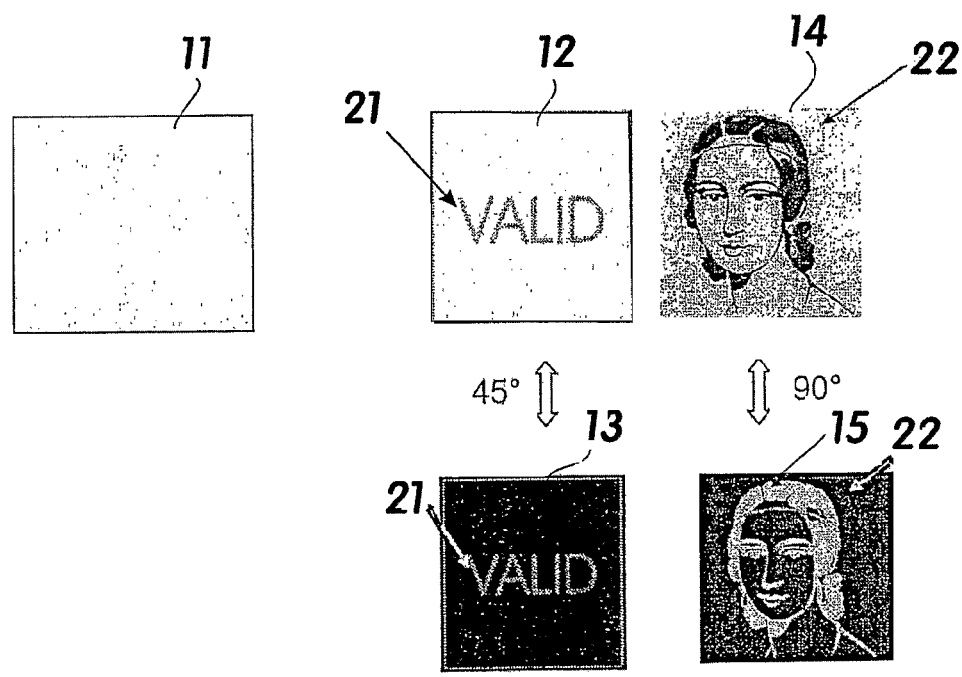
FIG. 1 shows by way of example a diagrammatic view of the representations which are afforded for a viewer when viewing a film according to the invention through different polarisers.
Figure 2:
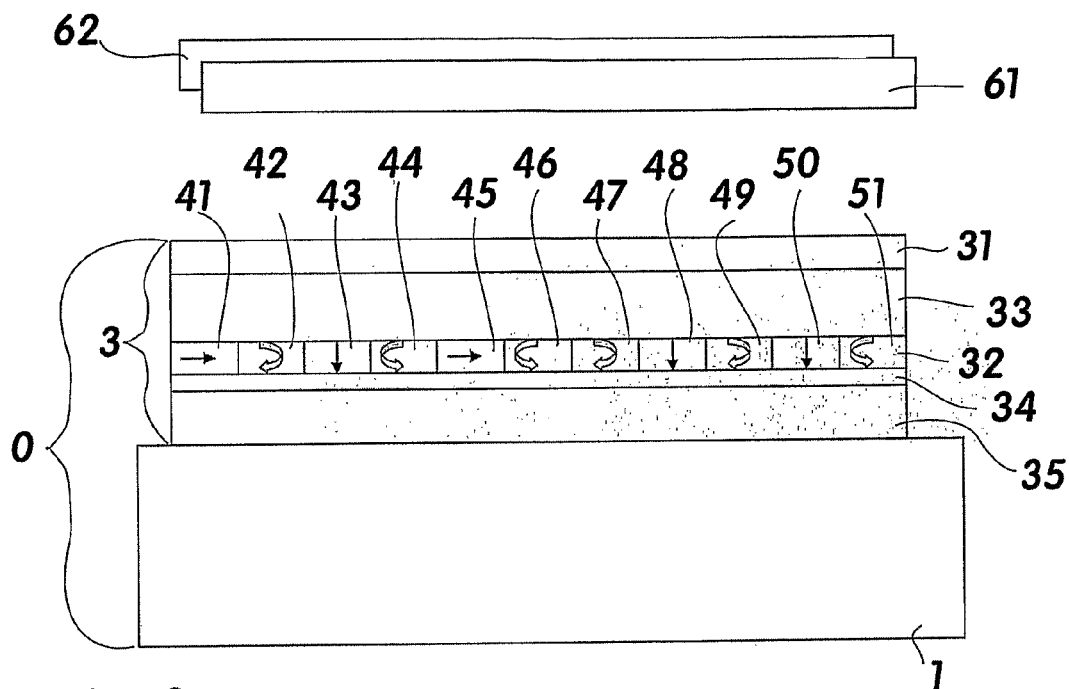
FIG. 2 shows a sectional view of a part of a security document with the film of FIG. 1 and two different polarisers.

FIG. 1 shows various representations 11, 12, 13, 14 and 15 which are afforded for the viewer when viewing the security document shown in FIG. 2, when viewing without a polariser, when viewing through a linear polariser and when viewing through a circular polariser. The representation 11 is provided for the viewer when viewing without a polariser. The representations 12 and 13 are provided for the viewer when viewing through a linear polariser, with the linear polariser in the representation 13 being rotated through 45° with respect to the representation 12. The representations 14 and 15 are afforded for the viewer when viewing through a circular polariser, with the circular polariser in the representation 15 being rotated through 90° relative to the representation 14. As shown in FIG. 1 the viewer when using a linear polariser thus has a first security feature 21, namely the text 'VALID', while when viewing through the circular polariser he has a second security feature 22, namely the representation of Clara Schumann.

The precise structure of the security document which exhibits the effect discussed with reference to FIG. 1 will now be described with reference to FIGS. 2, 3 and 5:

FIG. 2 shows the diagrammatic structure of a security document 0 and two polarisers, namely a linear polariser 61 and a circular polariser 62.

The security document 0 is for example a banknote, an identity card or pass, a ticket or a software certificate. The security document 0 comprises a carrier element 1 and a film 3 which is applied to the carrier element (or introduced into the carrier element). The carrier element 1 here comprises for example paper or a plastic material. The film 3 is applied to the carrier preferably in the form of a security strip or a security patch or is introduced thereinto in the form of a security thread. The carrier element 1 can additionally contain further security features. The carrier element 1 can be for example printed upon in colour and/or have embossings, for example the name of the card holder.

The film 3 is preferably applied to the carrier element 1 in the form of a transfer layer of a transfer film, in particular a hot stamping film. In that case the film 3 has a protective lacquer layer 31, a replication layer 33, an anisotropic polymer layer 32, a reflection layer 34 and an adhesive layer 35.

The protective lacquer layer 31 is preferably of a thickness of about 0.3 to 1.2 µm. The layer 33 is a replication layer in which diffractive structures are embossed by means of a stamping embossing tool. In this case the replication layer 33 preferably comprises a transparent thermoplastic material which can be applied for example by a printing process.

In that respect the replication lacquer is for example of the following composition:

| Component | Parts by weight |
|---|---|
| High-molecular PMMA resin | 2000 |
| Silicone alkyd | 300 |
| Non-ionic wetting agent | 50 |
| Low-viscosity nitrocellulose | 750 |
| Methyl ethyl ketone | 12000 |
| Toluene | 2000 |
| Diacetone alcohol | 2500 |

The replication layer 33 is thus applied for example by means of a line raster intaglio printing cylinder with an application weight of 2.2 g/cm² after drying and then dried in a drying passage at a temperature of 100 to 120° C. A diffractive structure is then embossed into the replication layer 33 at about 130° C. by means of a female die comprising for example nickel. In the operation of embossing the diffractive structure the female die is preferably electrically heated. Before the female die is lifted off the replication layer 33 after the embossing operation the female die can be cooled down again. After the diffractive structure has been embossed into the replication layer the replication lacquer is hardened by cross-linking or in some other fashion.

A layer comprising an optically anisotropic polymer material, preferably a liquid crystal material (liquid crystal=LC), is then applied to the replication layer 33. In principle all liquid crystal materials which are referred to in the above-mentioned specifications can be used for the layer 32. Preferably a nematic liquid crystal material of the OPALVA® series from Vantico AG, Basle, CH, is used. That liquid crystal material is applied to the replication layer 33 over the full surface area involved or partially, preferably by means of a printing process, preferably with an application weight which with a planar surface would give a layer thickness of 0.5 μm to 5 μm. The effective layer thickness of the anisotropic polymer layer 32, which is locally formed after application of the liquid crystal material, is influenced in this case by the diffractive structure which is embossed into the replication layer 33.

The liquid crystals of the anisotropic polymer layer 32 are then aligned if necessary with the application of heat. Finally UV hardening or thermally induced radical cross-linking of the liquid crystal material is effected for fixing the orientation of the liquid crystal molecules.

In addition it is also possible for the layer which has been applied by printing and which comprises a solvent-bearing liquid crystal material to be subjected to a drying process and for the liquid crystal molecules to be oriented during evaporation of the solvent, in accordance with the diffractive structure. It is also possible for solvent-free liquid crystal material to be applied by a printing process, after which the orientation is fixed by cross-linking.

In addition optionally a protective lacquer layer can be applied by a printing process to the anisotropic polymer layer 32. That protective lacquer layer is for example of a thickness of 0.5 μm to 3 μm and preferably comprises UV-cross-linkable acrylates or abrasion-resistant thermoplastic acrylates.

The reflector layer 34 is then applied. The reflector layer 34 preferably involves a thin vapour-deposited metal layer or an HRI layer (HRI=high refraction index). Essentially chromium, aluminium, copper, iron, nickel, silver or gold or an alloy with those materials are considered as the material for the metal layer.

The adhesive layer 35 is then applied, which is preferably a thermally activatable adhesive.

Governed by different structural parameters of the diffractive structure which is introduced into the adjoining replication layer 33 the anisotropic polymer layer 32 has different polarisation properties in region-wise manner. Thus FIG. 2 by way of example shows a plurality of mutually juxtaposed regions 41 to 51 in which the anisotropic polymer layer 32 has different polarisation properties. In first regions 41, 43, 45, 48 and 50 the anisotropic polymer layer 32 has linearly polarising properties or properties which rotate the polarisation direction, in dependence on the liquid crystal material used for the anisotropic polymer layer 32. In second regions 42, 44, 46, 47, 49 and 51 the anisotropic polymer layer 32 has substantially circularly polarising properties. In this respect the term circularly polarising properties is used to denote any shift in the phase position of the field vector in X- and Y-directions, for which the conditions of the phase position of linearly polarised light do not apply (phase difference=m π, m=integer).

As indicated in FIG. 2 the azimuth orientation of the liquid crystal molecules differs in the linearly polarised regions 41 and 45 on the one hand and 43, 48 and 50 on the other hand. In addition the anisotropic polymer layer 32 has for example dextrorotatory circularly polarising properties in the regions 42, 47 and 49 and laevorotatory circularly polarising properties in the regions 44, 46 and 51. In that respect the handedness of the circularly polarising light is determined by the liquid crystal material which is used in the respective region and which is partially applied for example by a printing process.

Figure 3:
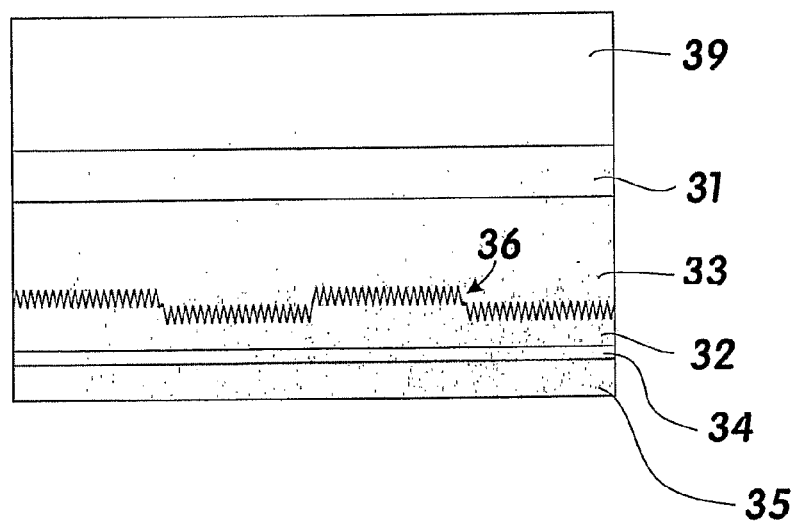
FIG. 3 shows a sectional view of a detail of the film of FIG. 1, FIGS. 4a and 4b are diagrammatic views of different diffractive structures.

FIG. 3 shows by way of example the diagrammatic structure of a transfer film which can be used for the production of the security document 0. FIG. 3 shows a carrier film 39 and a transfer layer which comprises the protective lacquer layer 31, the replication layer 33, the anisotropic polymer layer 32, the reflector layer 34 and the adhesive layer 35. The carrier film 39 is for example of a thickness of about 12 μm to 50 mm and preferably comprises a polyester film.

Preferably a release layer (not shown here) is arranged between the carrier film 39 and the protective lacquer layer 31.

As shown in FIG. 3 a diffractive structure 36 is embossed in the replication layer 33. The structural parameters of the diffractive structure differ here, as indicated in FIG. 3, in regions which are associated with first regions which are linearly polarising or which rotate the direction of rotation of the incident light, on the one hand, and which are associated with circularly polarising regions on the other hand. The orientation of the liquid crystals in those regions is determined substantially by the azimuth orientation of the diffractive structure. The polarisation properties, that is to say whether a region has circularly polarising properties or properties which linearly polarise or which rotate the direction of rotation is determined essentially by the mean structural depth of the diffractive structure in the respective region. In that respect, differences in the mean structural depth which are in the range of 200 to 500 nm and which thus do not satisfy the λ/4 condition can already cause a change in the polarisation properties of the respective region.

Good results can be achieved for example when selecting the following structures for regions which can be visualised with a circular polariser:

A combination grating is used, which comprises an isotropic matt structure and a linear grating with a large number of lines. In that respect for example a sine grating can be used as the linear grating. In that case the matt structure is preferably of a depth of 200 nm to 800 nm and has a correlation length in the μm range.

Figure 4A:
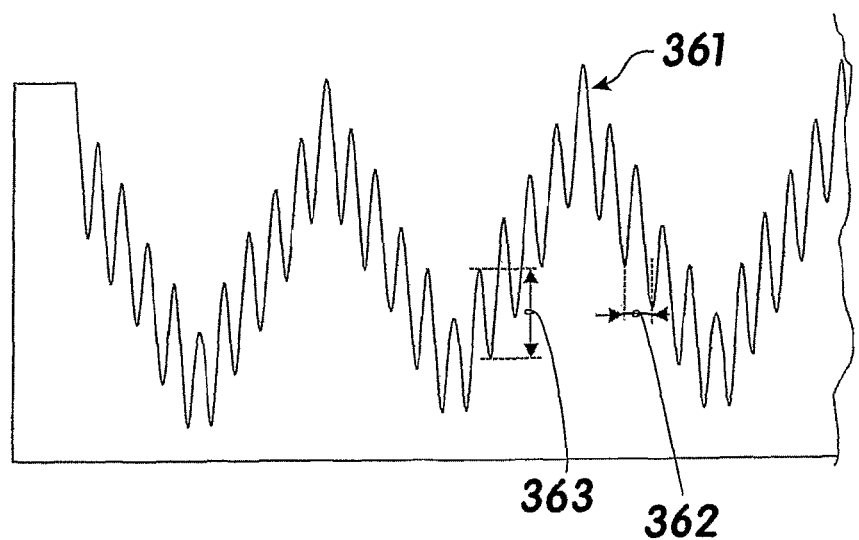

An isotropic matt structure which can be used for that purpose comprises for example substantially identically shaped three-dimensional structural elements whose base surfaces involve lateral dimensions in the range of 1 μm to 100 μm and whose side surfaces include an angle of inclination of 450 relative to a free surface of the film. In that respect it is also possible to use isotropic matt structures involving smaller lateral dimensions, which are no longer arranged exactly periodically on the base plane. That matt structure is then for example additively, multiplicatively and so forth superimposed with the above-described line grating with a large number of lines, for example a number of lines of 1500 lines per mm to 3500 lines per mm and of a depth of 50 nm to 500 nm. That affords for example the structure 361 which is shown in FIG. 4a and which is formed by the superimposition of an isotropic spatial matt structure of that kind with a line grating which involves a structural depth 363 and a grating period 362. In that case FIG. 4a only shows a diagrammatic representation which is not true to scale of such a matt structure. In accordance with the preferred embodiment of the invention the high-frequency sine grating is substantially shallower than the matt structure.

Furthermore it is also possible to use as matt structures, isotropic matt structures in which the microscopically fine relief structural elements are randomly distributed so that the matt structure can be described only by means of statistical characteristic values such as for example mean roughness, correlation length and so forth.

In regard to the details of matt structures which can be used attention is further directed to WO 03/055691 A1.

Figure 4B:
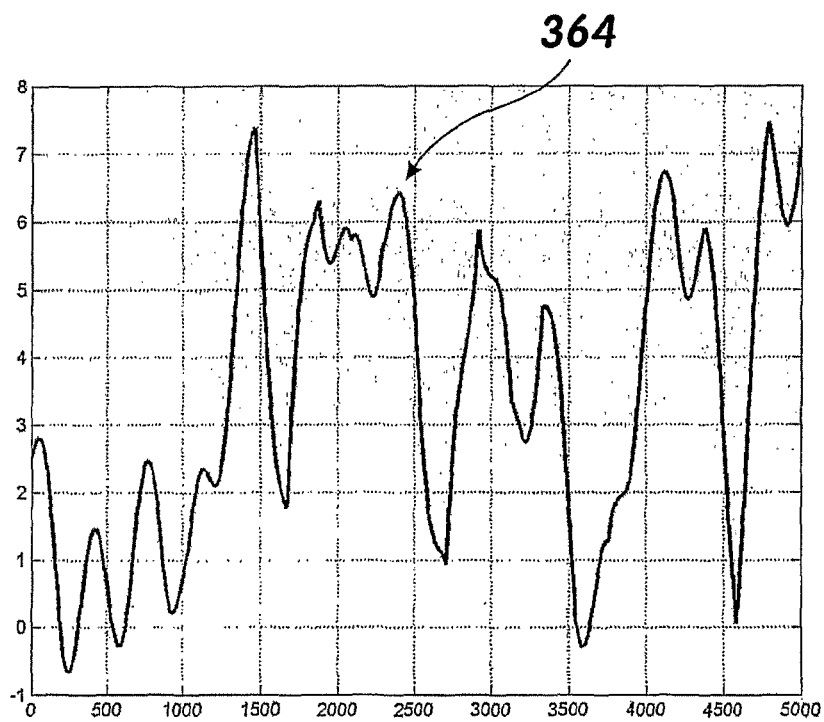

FIG. 4b now shows a diagrammatic representation of a structure 364 which is formed from the superimposition of a matt structure with a statistical distribution of the structural elements and a line grating as described hereinbefore with a large number of lines. In the embodiment of FIG. 4b a relatively shallow, high-frequency sine grating is superimposed with a coarser, markedly deeper matt structure.

Items of information are afforded by virtue of the fact that the structures can be present in differing azimuth orientation and can thus encode various grey tones of a grey scale image. A simple case of a grey tone image is shown in FIG. 1. FIG. 1 shows a grey tone image with two grey scales, that is to say a black-and-white image. Here the background, namely the 'square', and the foreground, namely Clara Schumann, comprise the same base structure, in which respect an azimuth orientation of the line grating of 90° is adopted for the background and an azimuth orientation of the line grating of 0° is adopted for the foreground. For the regions which are associated with the representation of those items of information (square, Clara Schumann), for example a combination grating with a matt structure of a depth of 500 nm and a lateral correlation length of some μm as well as a sine grating with a number of lines of 2800 lines/mm and of a depth of 120 nm is used.

By way of example a line grating with a relatively large number of lines is used as the structure combination which is visualised by means of the linear polariser, in which respect the above-described combination grating can also serve as the background. Line gratings which can be used have for example a number of lines of 2000 lines/mm to 3500 lines/mm and are of a depth of 50 nm to 500 nm. Regions which are associated with the information 'VALID' as shown in FIG. 1 are thus oriented for example on a linear grating with a number of lines of 2860 lines/mm and of a depth of about 120 nm. In that respect the orientation of the gratings relative to each other is so selected that the contrast which occurs between the line grating (at 45°) and the combination grating (at 0° or 90°) can be rendered visible by means of a linear polariser.

Figure 5:
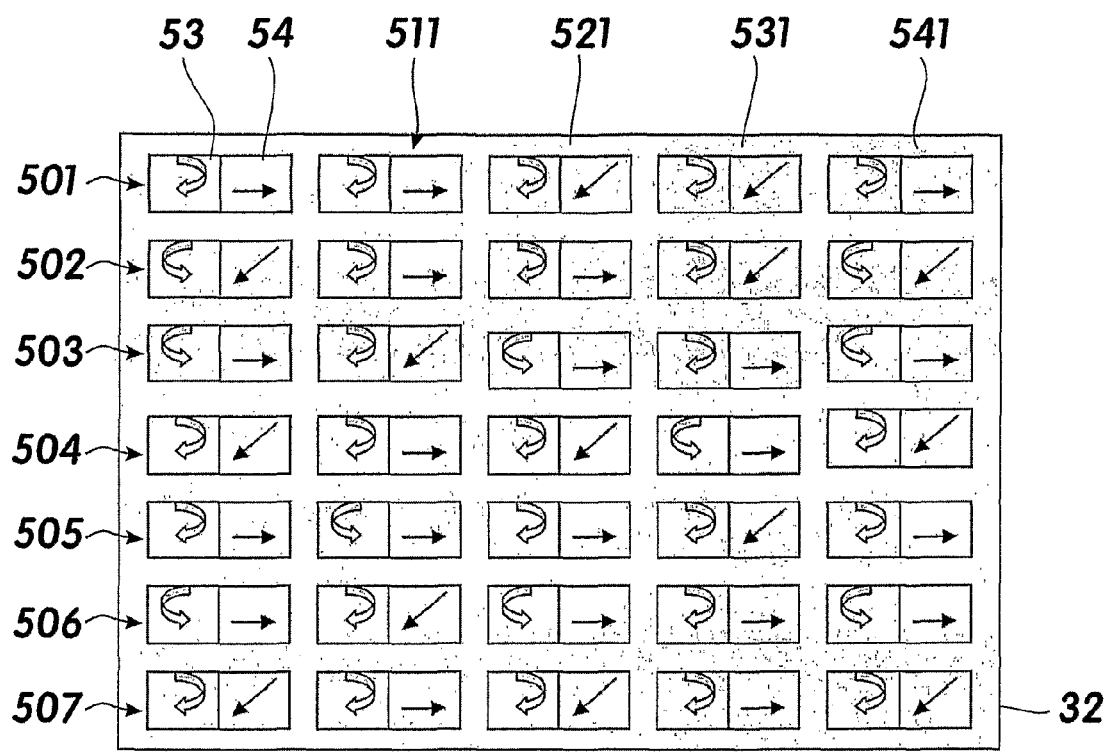
FIG. 5 shows a diagrammatic view of a part of an anisotropic polymer layer of the film of FIG. 1.

An advantageous arrangement of the first and second regions of the anisotropic polymer layer 32 will now be described with reference to FIG. 5:

FIG. 5 shows a part of the anisotropic polymer layer 32 which exhibits a plurality of image regions 501 to 541 which are aligned on a line raster pattern. Each of those image regions has at least one first region with properties which linear polarise or which rotate the direction of polarisation and at least one second region with circularly polarising properties. Thus for example the image region 501 has a first region 54 of that kind and a second region 53 of that kind. The anisotropic polymer layer 32 is preferably rastered in the region of interest at 50% respectively with a line density which is below the resolving power of the human eye. The line raster thus for example comprises 40 μm lines with 80 μm spacing. It is however also possible for more than two items of information to be rastered one into the other, in which case then the spacing of the raster lines should be below the resolving power of the human eye.

It is also possible for the film 3 to be in the form of a transmissive element and to dispense with the reflection layer 34. In accordance with the demonstrated laws a transmissive film of that kind is thus to be irradiated with linearly polarised or circularly polarised light, in which case the security features 21 and 22 are afforded by viewing with a linear or a circular polariser. In addition, irradiation is also possible only with linearly polarised light, with observation through a linear or a circular polariser. In that case it would also be possible for a linear polariser of that kind to be already integrated into the film 3 so that, in the case of transillumination with unpolarised light, when viewing through a linear polariser, a first security feature becomes visible while when viewing through a circular polariser a second security feature becomes visible.

A further embodiment of the invention will now be described with reference to FIG. 6, in which further items of information are encoded into a film according to the invention, that information being decoded by means of a polariser of a special configuration.

Figure 6:
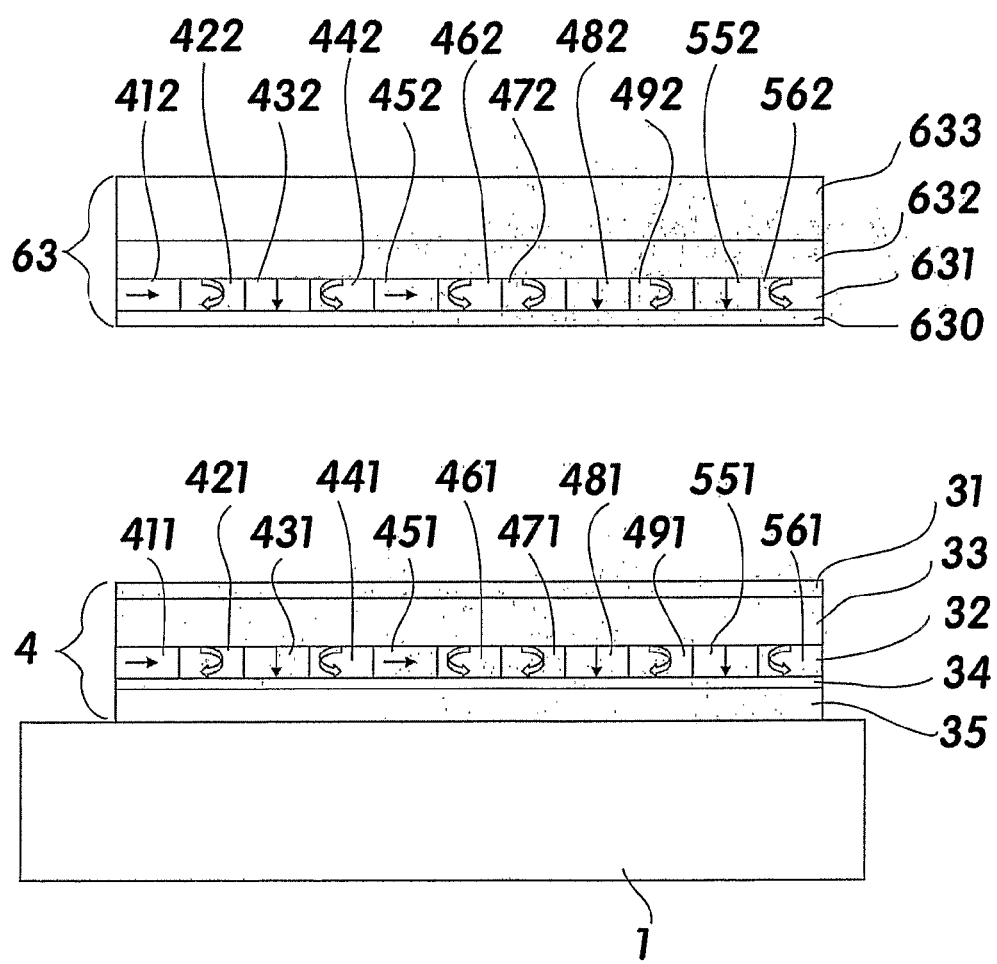
FIG. 6 shows a sectional view of a security document with a film according to the invention and a polariser for a further embodiment of the invention.

FIG. 6 shows a film 4 which is applied to the carrier element 1 and which has the protective lacquer layer 31, the replication layer 33, the anisotropic polymer layer 32, the reflector layer 34 and the adhesive layer 35. The protective lacquer layer 31, the replication layer 33, the anisotropic polymer layer 32, the reflector layer 34 and the adhesive layer 35 are of a configuration like the correspondingly identified layers shown in FIGS. 1 to 5. The anisotropic polymer layer 32 has a plurality of regions 411, 421, 431, 441, 451, 461, 471, 481, 491, 551 and 501 which are in the form of first regions with properties which linearly polarise or rotate the anisotropic polymer layer (411, 431, 451, 481 and 551) or in the form of second regions with circularly polarising properties (421, 441, 461, 471, 491 and 561). The security features set forth in the preceding embodiments are implemented in the film 4 by means of the specific configuration of those regions, which security features become visible on the one hand when viewing through a circular polariser and on the other hand when viewing through a linear polariser.

Furthermore FIG. 6 shows a special polariser 63 which is associated with the film 4 and which is substantially composed of a carrier 633, an anisotropic polymer layer which is formed by two layers 632 and 631 and which has regions for the detection of linearly polarised light and regions for the detection of circularly polarised light, and a protective lacquer layer 630. In that case the layer 632 is formed by a linear polariser and the layer 631 is formed by a liquid crystal layer which is oriented on a replication layer (not shown) and which in accordance with the anisotropic polymer layer 32 has first regions 412, 432, 452, 482 and 552 which have properties for rotating the polarisation direction, and second regions 422, 462, 472, 492 and 562 which have circularly polarising properties. That therefore provides a polariser 63 which acts as a linear polariser in first regions and as a circular polariser in second regions. Alternatively in that respect it is also possible for the polarisation direction of the layer 632 to be selected differently in dependence on the respective regions of the layer 631 so that the detected azimuth angle orientation of the linearly polarised light can be selected differently in region-wise manner.

By virtue of a suitably selected arrangement of the regions 411, 421, 431, 441, 451, 461, 471, 481, 491, 551 and 561 in relation to the regions 412, 422, 432, 442, 452, 462, 472, 482, 492, 552 and 562 it is possible to encode a further security feature in the anisotropic polymer layer 32, which can be rendered visible only by means of the special polariser 63. As it is possible to use for the pixels of that security feature, pixels of two different security features, namely linearly polarising and circularly polarising regions, the dependency of that security feature on the specific configuration and form of an individual security feature ceases to apply.

Figure 7:
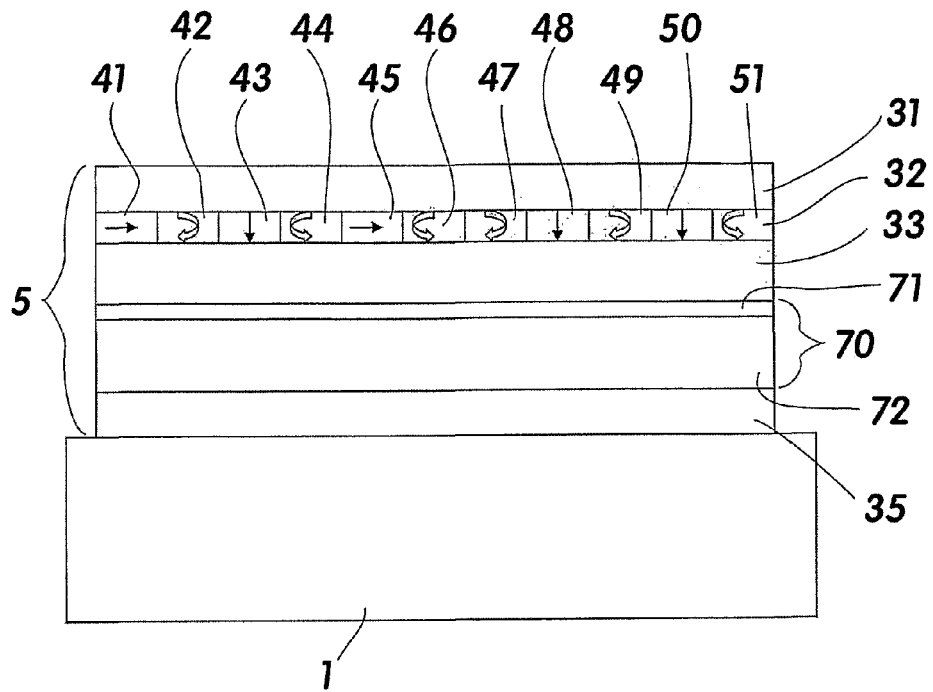
FIG. 7 shows a sectional view of a security document with a film according to the invention for a further embodiment of the invention.

FIG. 7 shows a further film 5 according to the invention which is applied to the carrier element 1. The film 5 has the protective lacquer layer 31, the anisotropic polymer layer 32, the replication layer 33, a layer system 70 and the adhesive layer 35. The protective lacquer layer 31, the anisotropic polymer layer 32, the replication layer 33 and the adhesive layer 35 are as described in the embodiments of FIGS. 1 to 5.

The layer system 70 provides a further optical security feature which is visible for the viewer without using a polariser. The layer system 70 thus for example involves an optically effective diffractive structure which is provided with a reflector layer and which provides for example a hologram as the optical security feature. In this case this can also involve a thin-film layer system which is of a transmissive or reflective nature and produces a viewing angle-dependent colour shift effect by means of interference. In accordance with the embodiment further described here the layer system 70 is a layer system which comprises an absorption layer 71 and a layer 72 of a cholesteric liquid crystal material. By way of example the cholesteric liquid crystal materials described in WO 01/55960 can be used as the cholesteric liquid crystal material. In this case the layer 72 is preferably of a thickness of 1 to 10 μm. The liquid crystals of the layer 72 are oriented by the shearing forces upon application. If necessary a further microscratched or brushed orientation layer can also be applied prior to application of the cholesteric liquid crystal material to the layer 71. In that case the layer 72 acts as a filter which, in dependence on the angle of incidence of the incident light, only reflects a specific wavelength component of the light so that a viewing angle-dependent colour shift effect is to be observed.

In order not to nullify the above-described properties of the anisotropic polymer layer 32 by the circularly polarising action of the layer 72 and in order to ensure recognisability of the colour shift effect generated by the layer 72 both in the first regions and also in the second regions, a layer 71 is provided here. The layer 71 is a semi-transparent mirror, for example a thin, possibly structured metal layer, for example an aluminium layer of a thickness of 1 nm to 50 nm.

The layer 71 provides that a part of the incident light is reflected at the layer 71 and thus produces the effects which have already been described hereinbefore. Only a part of the incident light impinges on the layer 72 and is reflected thereby circularly polarised. Accordingly the layer system 70 affords a layer system which reflects incident linearly polarised light both as linearly polarised light and also as selectively filtered circularly polarised light.

The layer 35 represents an adhesive layer which optionally can also be coloured in order to improve the optical appearance and/or the optical function (absorption) of the cholesteric layer 72.

Figure 8:
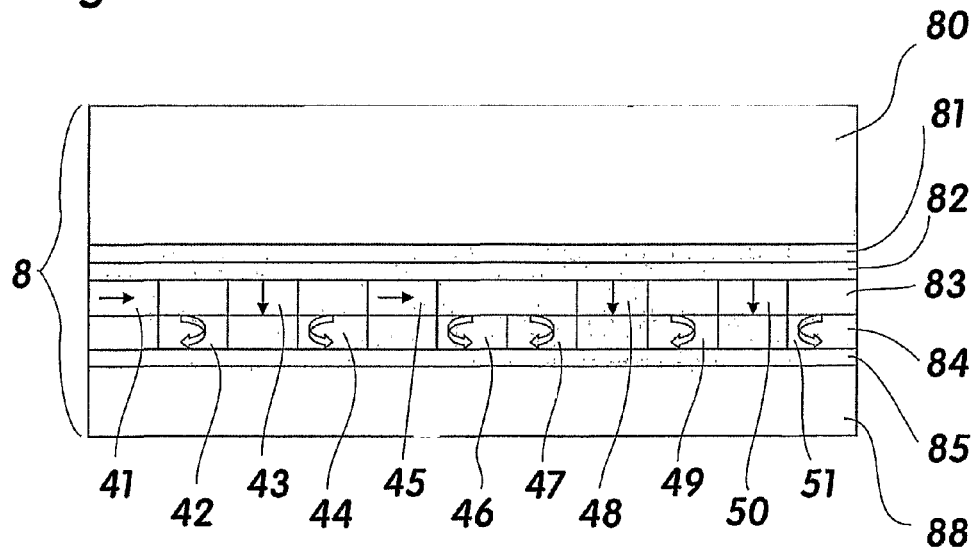
FIG. 8 shows a sectional view through a film according to the invention for a further embodiment of the invention.

FIG. 8 shows a further embodiment of the invention.

FIG. 8 shows a stamping film 8 comprising a carrier film 80, a protective lacquer layer 81, a retarder layer 82, a first anisotropic polymer layer 83, a second anisotropic polymer layer 84, a reflector layer 85 and an adhesive layer 88. The protective lacquer layer 81, the reflector layer 85 and the adhesive layer 88 are of a configuration like the corresponding layers 30, 31, 34 and 35 of the embodiments of FIGS. 1 to 5. The anisotropic polymer layers 83 and 84 each comprise a layer of an oriented liquid crystal material which, as described hereinbefore in the specific embodiments, were oriented on a replication layer with a diffractive structure or which have been applied to the film by means of a transfer process. In the latter case the transferred anisotropic polymer layers 83 and 84 preferably comprise an adhesive layer, an orientation layer and a liquid crystal layer which is oriented on the orientation layer and then cross-linked. The layer thicknesses and the liquid crystal materials of the anisotropic polymer layers 83 and 84 are in this respect so selected that the anisotropic polymer layer 83 has in region-wise manner linearly polarising properties or polarisation direction-rotating properties and the anisotropic polymer layer 84 has in region-wise manner circularly polarising properties.

As shown in FIG. 8 the two anisotropic polymer layers 83 and 84 in this case are applied in accurate register relationship with each other, thus respectively affording the regions 41, 43, 45, 48 and 50 in which there are linearly polarising or polarisation direction-rotating properties and affording the regions 42, 44, 46, 47, 49 and 51 in which there are circularly polarising properties.

The invention claimed is:

1. A film comprising: at least one anisotropic polymer layer of an at least partially oriented liquid crystal material, wherein the at least one anisotropic polymer layer includes at least one first region which forms a first security feature responsive to linearly polarized light, the at least one anisotropic polymer layer further includes at least one second region which forms a second security feature responsive to elliptically polarized light, wherein the first security feature is visualised when viewed through a first polariser and the second security feature is visualised when viewed through a second polarizer, wherein the first polarizer is responsive to a different polarisation state of an incident light than the second polarizer, wherein the film includes at least one replication layer to which the anisotropic polymer layer is applied and in which a diffractive structure for orientation of the anisotropic polymer layer is introduced into the surface of the replication layer, wherein the diffractive structure is formed from a superimposition of a first structure for orientation of the liquid crystal material and a second structure for adjusting at least one of the polarized light responses, wherein the first structure is a line grating with a spatial frequency of 1500 lines/mm to 3500 lines/mm and a depth of 50 nm to 500 nm.

2. A film according to claim 1, wherein one of the at least one anisotropic polymer layers includes both the at least one first and the at least one second regions, wherein the at least one first and the at least one second regions of the anisotropic polymer layer are arranged in mutually juxtaposed relationship.

3. A film according to claim 1, wherein one or more structural parameters of the diffractive structure differ in the first and second regions.

4. A film according to claim 3, wherein the mean structural depth of the diffractive structure is different in the first and the second regions.

5. A film according to claim 1, wherein the line grating has region-wise a different azimuth orientation, with a continuously changing azimuth angle.

6. A film according to claim 1, wherein the second structure comprises a structure whose mean structural depth differs in first and second regions.

7. A film according to claim 1, wherein the second structure comprises a matt structure of a structural depth of 200 nm to 800 nm, which is provided in at least one of the first and the second regions.

8. A film according to claim 7, wherein the matt structure is an isotropic matt structure with a lateral correlation length of 1 to 10 µm.

9. A film according to claim 1, wherein the film has two or more anisotropic polymer layers of an at least partially oriented liquid crystal material, wherein a first anisotropic polymer layer has a region with properties that output linearly polarized light and a second anisotropic polymer layer has a region with properties that output elliptically polarized light.

10. A film according to claim 1, further comprising: a further anisotropic polymer layer which has at least partial properties for outputting elliptically polarized light, wherein regions of the further anisotropic polymer layer includes elliptically polarising properties which are arranged over or beneath the first and second regions of the at least one anisotropic polymer layer.

11. A film according to claim 1, wherein the at least one anisotropic polymer layer has a plurality of image regions which are of an extent of less than 40 µm, wherein arranged in each of the image regions is at least one of the first and second regions.

12. A film according to claim 1, wherein the first security feature includes an object with varying azimuth orientation for generating a grey scale image.

13. A film according to claim 1, wherein the second security feature includes an object with varying azimuth orientation for generating a grey scale image.

14. A film according to claim 1, wherein the first security feature includes two or more objects respectively having regions with different polarisation properties.

15. A film according to claim 1, wherein the second security feature includes two or more objects respectively having regions with different properties which output elliptically polarized light.

16. A film according to claim 1, wherein there are arranged at least one of a third and forth regions for respectively encoding a third or a fourth security feature, which is visible when viewing through an associated respective third or fourth polariser provided with an associated decoding polarisation pattern.

17. A film according to claim 1, further including there are arranged third and fourth regions for encoding a fifth security feature which is visible when viewing through a fifth polariser which is provided with an associated decoding polarisation pattern and which has regions for the detection of linearly polarised light and regions for the detection of elliptically polarised light.

18. A film according to claim 1, further comprising a further layer with a further optically effectively diffractive structure which provides a further optically recognisable security feature.

19. A film according to claim 18, wherein the further optically effective diffractive structure at least region-wise overlies the first and the second regions.

20. A film according to claim 1, wherein the film has a thin-film layer system for producing colour shifts by means of interference, which provides a further optically recognisable security feature.

21. A film according to claim 18, wherein a thin-film layer system at least region-wise overlies the first and second regions.

22. A film according to claim 1, wherein the film has a reflecting layer, including at least one of a metallic layer and an HRI layer.

23. A film comprising:
   at least one anisotropic polymer layer of an at least partially oriented liquid crystal material, wherein the at least one anisotropic polymer layer includes at least one first region which forms a first security feature responsive to linearly polarized light, the at least one anisotropic polymer layer further includes at least one second region which forms a second security feature responsive to elliptically polarized light, wherein the first security feature is visualised when viewed through a first polariser and the second security feature is visualised when viewed through a second polarizer, wherein the first polarizer is responsive to a different polarisation state of an incident light than the second polarizer, wherein the film has a reflecting layer, including at least one of a metallic layer and an HRI layer, wherein the reflecting layer is formed by a layer of a cholesteric liquid crystal material which generates a viewing angle-dependent colour shift effect as a further optically recognisable security feature.

24. A film according to claim 23, wherein the film has a semi-transparent layer, which is arranged between the layer of a cholesteric liquid crystal material and the at least one anisotropic polymer layer.

25. A film according to claim 22, wherein the reflecting layer is partial, thereby affording a further optically recognisable security feature.

26. A film according to claim 1, wherein the film has an optical security element for safeguarding at least one of banknotes, credit cards, passes and identity cards.

27. A film according to claim 26, wherein the film is shaped in the form of a security thread.

28. A film according to claim 26, wherein at least one of the first and the second security features are latent security features.

* * * * *